United States Patent [19]

Colautti

[11] 3,860,283
[45] Jan. 14, 1975

[54] SWIVEL SEAT LATCH MECHANISM
[75] Inventor: Albert J. Colautti, Windsor, Ontario, Canada
[73] Assignee: General Motors Corporation, Detroit, Mich.
[22] Filed: Sept. 17, 1973
[21] Appl. No.: 397,850

[52] U.S. Cl................. 296/65 R, 248/425, 297/349
[51] Int. Cl............................................. B60n 1/04
[58] Field of Search........... 296/65 R; 297/349, 242; 248/425

[56] References Cited
UNITED STATES PATENTS

| 2,715,433 | 8/1955 | Dolgorukov | 296/65 R |
| 3,659,895 | 5/1972 | Dresden | 296/65 R |
| R17,680 | 5/1930 | Smelker | 297/349 X |

FOREIGN PATENTS OR APPLICATIONS

| 234,567 | 10/1944 | Switzerland | 297/242 |

Primary Examiner—Albert J. Makay
Assistant Examiner—Donald W. Underwood
Attorney, Agent, or Firm—Herbert Furman

[57] ABSTRACT

A disc-shaped member is attached to a vehicle seat and is in turn rotatably mounted on a base member secured to the vehicle floor by a conventional fore and aft seat adjuster. A locking bar has its forward end fixedly attached to the base member and is cantilevered generally longitudinally of the vehicle. The other end of the cantilevered locking bar has an upstanding projection which is engaged in a notch in the peripheral edge of the disc-shaped member to prevent rotation of the disc-shaped member relative the base member. An L-shaped operating lever extends laterally of the vehicle seat and has a depending leg. A first pivot pivotally mounts the depending leg on the base member, and a second pivot pivotally connects the operating lever with an integral laterally extending arm of the cantilevered locking bar. When the operating lever is pivoted about its first pivot, the second pivot is translated through an arc and the cantilevered locking bar is flexed laterally to carry the upstanding projection out of engagement of the notch and permit rotary movement of the vehicle seat. In order to minimize the vertical component of flexure of the cantilevered locking bar as the second pivot is moved through its arcuate path, the first pivot is located in a line which perpendicularly bisects the chord of the arc through which the second pivot is translated during movement of the cantilevered locking bar from its unflexed to its fully flexed position in which the seat is unlatched for rotary movement.

2 Claims, 6 Drawing Figures

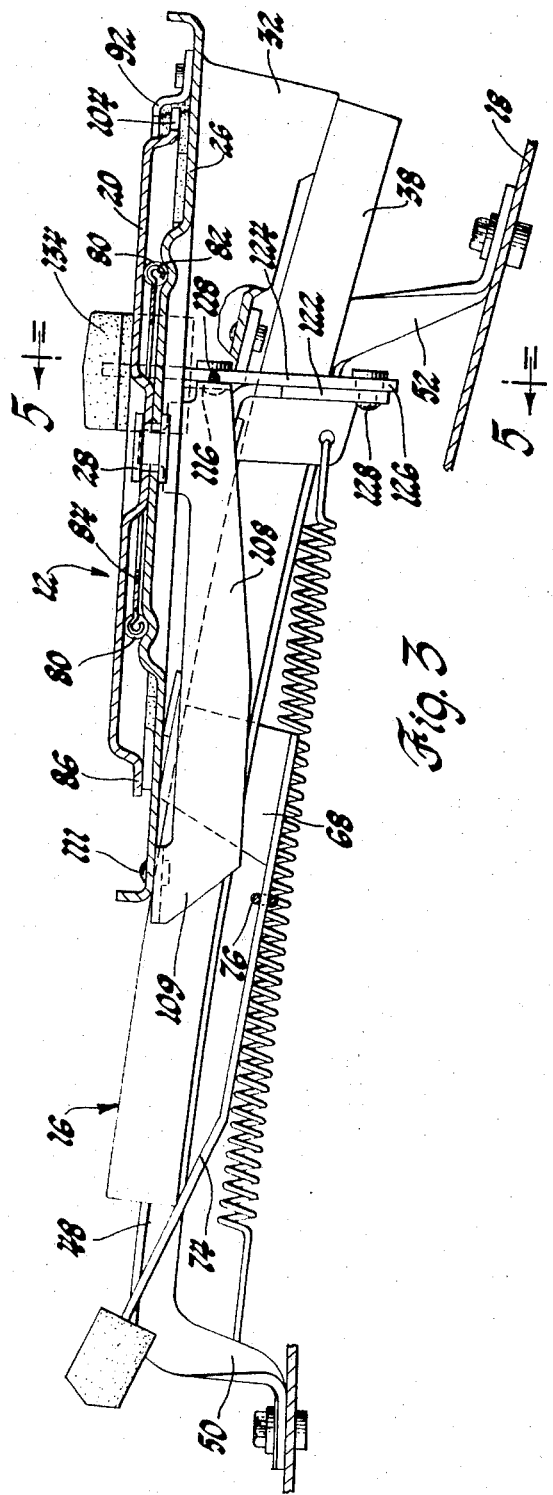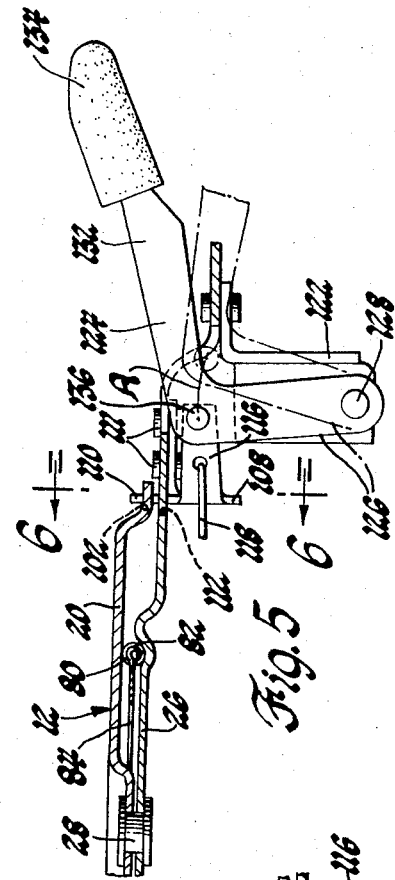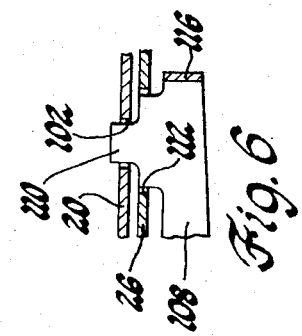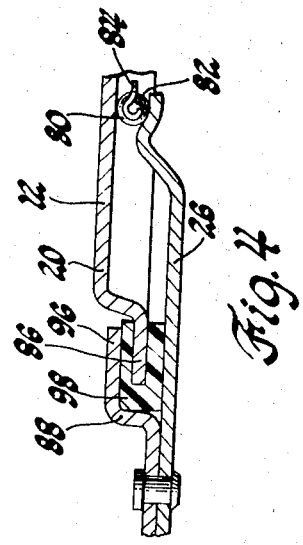

SWIVEL SEAT LATCH MECHANISM

The invention relates to a vehicle seat and more particularly to a swivel seat latch mechanism.

Colautti et al. U.S. Pat. No. 3,572,817 discloses a swivel seat in which a disc-shaped member is attached to the vehicle seat and is rotatably mounted on a base member which is in turn attached to the vehicle floor by a conventional fore and aft seat adjusting track assembly. A ball bearing assembly is provided between the base member and a disc-shaped member to provide substantially frictionless rotational movement of the disc-shaped member relative the base member.

The present invention provides an improved latch arrangement for swivel seats. According to the invention, a locking bar has its forward end fixedly attached to the base member and is cantilevered therefrom to extend generally longitudinally of the vehicle. The other end of the cantilevered locking bar has an upstanding projection which is engageable in a notch in the peripheral edge of the disc-shaped member. When the cantilevered locking bar is in its normal unflexed state, the upstanding projection is engaged in the notch of the disc-shaped member to prevent rotation of the disc-shaped member relative the base member. A generally L-shaped operating lever has one leg extending laterally of the seat and the other leg depending downwardly and pivotally attached to the base member by a first pivot. The cantilevered locking bar has a laterally projecting integral arm which is connected to the operating lever by a second pivot. Accordingly, when the operating lever is pivoted about its first pivot the cantilevered locking bar is flexed laterally and the upstanding projection is carried out of engagement of the notch to permit rotary movement of the vehicle seat. When the operating lever is pivoted about its first pivot the second pivot moves in an arcuate path. As a result of this arcuate movement of the second pivot, the cantilevered locking bar will have a vertical component of flexure as well as the lateral component of flexure. In order to minimize the degree of vertical flexure of the cantilevered locking bar, the first pivot is located on a line which perpendicularly bisects the chord of the arc through which the second pivot is translated during movement of the cantilevered locking bar from its unflexed state to its fully flexed state in which the vehicle seat is unlatched for swiveling movement.

Referring to the drawings:

FIG. 3 is an enlarged view similar to FIG. 1 having parts broken away in a section;

FIG. 4 is a partial sectional view taken in the directions of arrows 4—4 of FIG. 2;

FIG. 5 is a sectional view taken in the direction of arrows 5—5 of FIG. 3; and

FIG. 6 is a sectional view taken in the directions of arrows 6—6 of FIG. 5.

Figure 1:
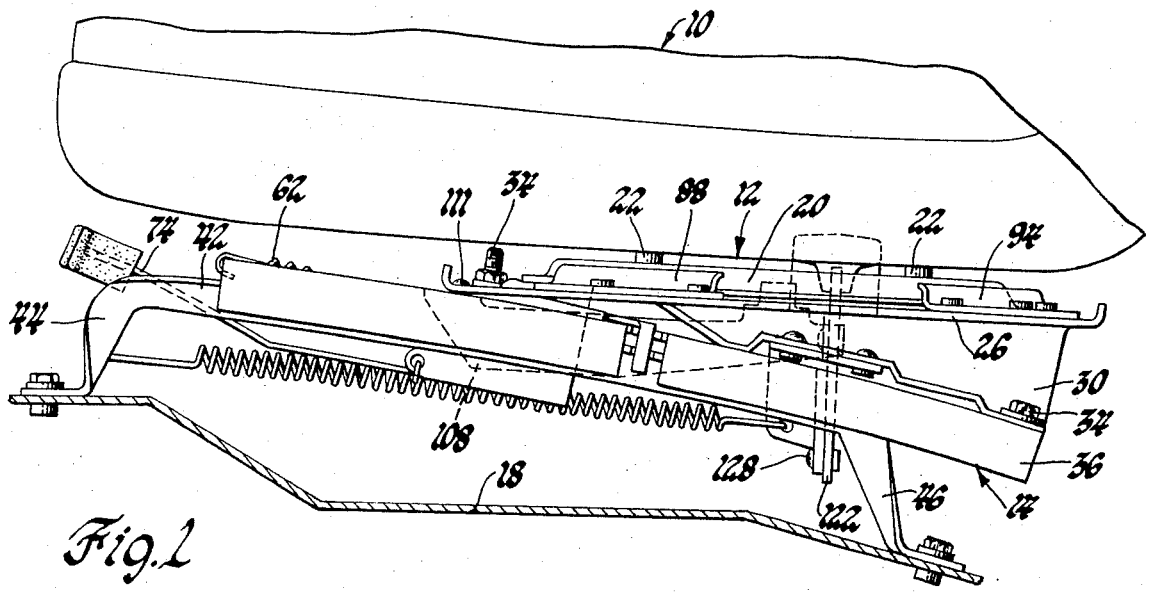
FIG. 1 is a side elevation view showing a swivel seat having a latch mechanism according to the invention.
Figure 2:
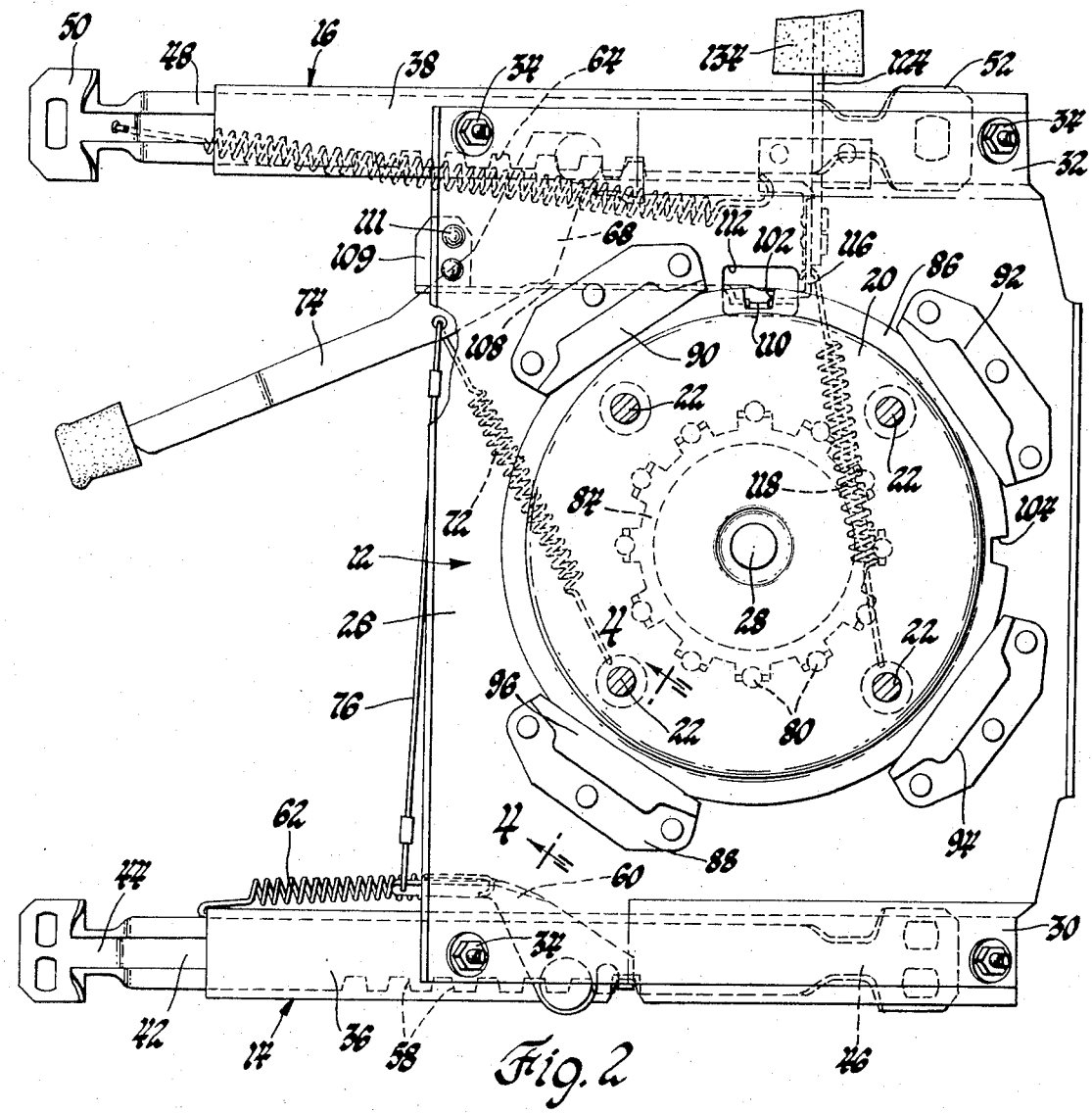
FIG. 2 is a plan view of the seat adjuster mechanism of FIG. 1.

Referring to the drawings, and more particularly FIGS. 1 and 2 thereof, a vehicle seat 10 of the bucket type is shown with its lower end or bottom supported on a swivel type seat adjuster mechanism generally indicated by the numeral 12 and having a latch according to the invention. The swivel seat adjuster mechanism 12 is in turn carried by a pair of laterally spaced track assemblies 14 and 16 each of which extends longitudinally of the vehicle and is rigidly secured to the vehicle floor 18. Thus, as will become apparent as the description of the invention proceeds, the swivel seat adjuster mechanism 12 provides for swivel or rotational movement of the vehicle seat 10 about a substantially vertical axis while the track assemblies 14 and 16 provide for fore and aft movement of the vehicle seat 10 relative the floor 18. Moreover, although not shown, the vehicle seat 10 is positioned adjacent to a vehicle door which, as viewed in FIG. 2 would be located at the lower end of the drawing sheet. Thus, it will be understood that, as seen in FIGS. 1 and 2, the vehicle seat 10 is facing the front of the vehicle and when it is desired to swivel the seat toward the door to enhance access to the seat, the seat is rotated in the counterclockwise direction.

The swivel seat adjuster mechanism 12 includes a disc-shaped seat support member 20 which is rigidly attached to the underside of the vehicle seat 10 by a plurality of bolts 22. The central portion of the disc-shaped seat support member 20 is rotatably secured to a base member 26 by a pivot pin 28, as best seen in FIG. 3, to provide for swivel or rotational movement of the vehicle seat 10 about a vertical axis. The base member 26 is a generally rectangular sheet metal stamping and has integral legs 30 and 32 which extend laterally therefrom and downwardly to respectively engage the track assemblies 14 and 16. The track assemblies 14 and 16 respectively include upper tracks 36 and 38 which are attached to the respective legs 30 and 32 of base member 26 by nut and bolt assemblies 34. The track assembly 14 also has a lower track 42 having legs 44 and 46 by which it is attached to the vehicle floor 18. The track assembly 16 has a similar lower track 48 with legs 50 and 52 attached to the vehicle floor 18. Each of the track assemblies 14 and 16 includes a plurality of ball bearings or roller bearings, not shown, interposed between the upper track and lower track to permit free sliding movement of the upper track on the lower track to adjust the fore and aft position of the vehicle seat 10.

A conventional locking mechanism is provided on track assemblies 14 and 16. Referring to FIG. 2, the lower track 42 has spaced notches 58 which are selectively engaged by a lock lever 60 which is pivotally mounted on the upper track 36. A spring 62 acts between the upper track 36 and the lock lever 60 to urge the lock lever 60 to its normal position of FIG. 2 wherein the lock lever 60 is engaged in one of the notches 58 to prevent sliding movement of the upper track 36 on the lower track 42. The track assembly 16 is provided with a similar locking arrangement including notches 64 in the lower track 48 and a lock lever 68 pivotally mounted on the upper track 38. Spring 72 urges lock lever 68 to its normal position wherein the lock lever is engaged in one of the notches 64 to prevent sliding movement of the upper track 38 on the lower track 48. Lock lever 68 has an integral operating handle 74 by which the seat occupant may rotate the lock lever 68 out of engagement with the notches 64 to permit fore and aft adjustment of the vehicle seat. A connecting rod 76 acts between the lock levers 68 and 60 to its unlocked position when the operating handle 74 is rotated.

Frictionless rotation of the disc-shaped seat support member 20 on the base member 26 is provided by a plurality of circumferentially spaced ball bearings 80 which are located within an annular groove 82 of the base member 26. The ball bearings 80 are supported by an annular cage 84 which spaces the balls circumferentially and assures uniform rotational movement thereof during swiveling movement of the vehicle seat.

As best seen in FIG. 4 the disc-shaped seat support member 20 is supported at its rim 86 by four circumferentially spaced guide members 88, 90, 92 and 94 each of which comprises an outer housing 96 which defines a pocket for securing a plastic shoe 98. The shoes 98 are generally channel shaped in cross section to receive a portion of the rim 86 and frictionally engage the upper and lower surfaces thereof. The guide members 88, 90, 92 and 94 are spaced to stabilize the seat against undesirable tilting movement about the swivel axis.

A latch mechanism is provided to latch the swivel seat in its forward facing position as well as its easy-enter position facing the vehicle door. As best seen in FIG. 2, notches 102 and 104 are provided in the rim 86 of the disc-shaped seat support member 20 and are spaced 90° from one another. An elongated cantilevered locking bar 108, as best seen in FIG. 3, has its forward end 109 fixedly attached to the forward edge of the base member 26 by rivets 111 to be cantilevered therefrom and extends longitudinally of the vehicle. An upstanding tang 110 at the rearward end of locking bar 108 extends through an opening 112 in the base member 26 and continues upwardly to extend into the notch 102 in the rim 86 of the disc-shaped seat support member. The cantilevered locking bar 108 has a normal unflexed position in which the upstanding tang 110 enters notch 102. The rearward end of the lock bar 110 is bent laterally too provide an integral arm 116. A spring 118 acts between the base member 26 and the arm 116 to restrain the rearward end of locking bar 108 from lateral flexing. Accordingly, the upstanding projection 110 is held in the notch 102 to prevent rotary movement of the disc-shaped seat support member 20.

An operating handle arrangement, as best seen in FIG. 5, is provided to flex the cantilevered locking bar 108 laterally of the seat to withdraw the projection 110 from the notch 102 so that the seat may be rotated. As best seen in FIGS. 3 and 5, a bracket 122 is attached to the base member 26 and extends downwardly therefrom generally below the arm 116 of the cantilevered lock bar 108. A generally L-shaped lock operating lever 124 has a downwardly depending leg 126 pivoted to the bracket 122 by a pivot 128. The other leg 132 of the operating lever 124 extends laterally of the seat in the plane of the arm 116 and has a hand grip 134. The central portion of the operating lever 124 is pivoted to the end of arm 116 by a pivot 136. A downward movement of the hand grip 134 by the seat occupant bodily rotates the operating lever 124 about its pivot 128. It will be apparent that such movement of the operating lever 124 moves the pivot 136 about pivot 128 in an arcuate path designated "A" to the phantom line indicated position and, accordingly, causes the cantilevered locking bar 108 to be flexed laterally of the vehicle seat from its unflexed position as permitted by yielding of the spring 118. Such flexure of the cantilevered locking bar 108 carries its upstanding tang 110 out of notch 102 to permit the seat occupant to swivel the seat as permitted by rotary movement of the disc-shaped seat support member 20 relative the base member 26. When the disc-shaped seat support member 20 has been rotated 90° toward the door, the upstanding projection 110, enters notch 104 as the cantilevered lock bar 108 returns to its unflexed position with the assist of the tension of spring 118.

An important feature of the invention is the relationship between the pivots 128 and 136. As will be apparent from FIG. 5, the movement of pivot 136 in the arcuate path A about the pivot 128 to flex the cantilevered locking bar 108 laterally also requires some vertical flexure of the locking bar 108. In order to minimize the vertical component of flexure of the cantilevered locking bar 108, the pivot 128 is located on a line which perpendicularly bisects the chord of the arc through which pivot 136 is moved. Thus the lateral flexure of the cantilevered locking bar 108 needed to move the upstanding tang 110 from the notch of the disc-shaped seat support member 20 is provided while the vertical flexure of the locking bar 108 is minimized.

Thus an improved latch mechanism for a vehicle swivel seat is provided.

What is claimed is:

1. In combination with a vehicle having a door located along one side thereof and a floor adapted to support a seat adjacent the door, an adjuster mechanism interposed between the seat and the floor for supporting the seat for rotary movement about a vertical axis between a first position wherein the seat faces forwardly and a second position wherein the seat faces the door, said adjuster mechanism comprising: a base member secured to the floor, a disc-shaped member attached to the seat, means mounting the disc-shaped member on the base member for rotational movement about a vertical axis, bearing means between the base member and the disc-shaped member for providing substantially frictionless rotational movement of the disc-shaped member relative the base member, at least one notch in the peripheral edge of the disc-shaped member, a locking bar having one end fixedly attached to the base member and cantilevered therefrom generally longitudinally of the vehicle, the other end of the locking bar having an upstanding projection engageable in the notch of the disc-shaped member when the lock bar is in its normal unflexed position to prevent rotation of the disc-shaped member relative the base member, an arm projecting laterally of the cantilevered locking bar, an operating lever generally coplanar of the arm and having a depending leg, first pivot means pivotally mounting the depending leg of the operating lever to the base member, and second pivot means connecting the laterally extending arm with the operating lever so that when the operating lever is pivoted about the first pivot means the cantilevered locking bar is flexed laterally and the upstanding projection thereof is moved out of engagement with the notch to permit rotary movement of the vehicle seat.

2. In combination with a vehicle having a door located along one side thereof and a floor adapted to support a seat adjacent the floor, an adjuster mechanism interposed between the seat and the floor for supporting the seat for rotational movement about a vertical axis between a first position wherein the seat faces forwardly and a second position wherein the seat faces the door, said adjuster mechanism comprising: a base member secured to the floor, a disc-shaped member attached to the seat, means mounting the disc-shaped member on the base member for rotational movement about a vertical axis, bearing means between the base member and the disc-shaped member providing substantially frictionless rotational movement of the disc-shaped member relative the base member, at least one notch in the peripheral edge of the disc-shaped member, a locking bar having one end fixedly attached to the base member and cantilevered therefrom generally longitudinally of the vehicle, the other end of the locking bar having an upstanding projection engageable in the notch of the disc-shaped member when the locking bar is in its normal unflexed state to prevent rotation of the disc-shaped member relative the base member, a laterally projecting arm on the cantilevered locking bar, an operating lever having one leg extending laterally of the vehicle seat and a depending leg, first pivot means pivotally mounting the depending leg of the operating lever to the base member, and second pivot means connecting the laterally extending arm of the locking bar to the operating lever, the second pivot means being translated through an arcuate path of movement when the operating lever is pivoted about the first pivot means to flex the cantilevered locking bar laterally and move the upstanding projection out of engagement of the notch of the disc-shaped member and permit rotary movement of the seat, the first pivot means being located in a line perpendicularly bisecting the chord of the arc through which the second pivot means is translated whereby the cantilevered locking bar is flexed laterally with a minimum of vertical flexure during the lateral flexure thereof.

* * * * *